United States Patent
Bley et al.

(10) Patent No.: US 10,794,486 B2
(45) Date of Patent: Oct. 6, 2020

(54) GEAR INDICATOR ILLUMINATION UNIT

(71) Applicant: Volkswagen Aktiengesellschaft, Wolfsburg (DE)

(72) Inventors: Bernhard Bley, Hannover (DE); Andreas Löhner, Vechelde (DE); Henning Wöhl-Bruhn, Cremlingen (DE); Oliver Von Sehlen, Eicklingen (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/607,517

(22) PCT Filed: Apr. 10, 2018

(86) PCT No.: PCT/EP2018/059189
§ 371 (c)(1),
(2) Date: Oct. 23, 2019

(87) PCT Pub. No.: WO2018/197204
PCT Pub. Date: Nov. 1, 2018

(65) Prior Publication Data
US 2020/0141489 A1    May 7, 2020

(30) Foreign Application Priority Data
Apr. 24, 2017 (DE) .................. 10 2017 206 818

(51) Int. Cl.
*B60Q 1/00* (2006.01)
*F16H 63/42* (2006.01)
*H05B 45/325* (2020.01)

(52) U.S. Cl.
CPC ........... *F16H 63/42* (2013.01); *H05B 45/325* (2020.01); *F16H 2063/423* (2013.01)

(58) Field of Classification Search
None
See application file for complete search history.

(56) References Cited

U.S. PATENT DOCUMENTS

| | | | |
|---|---|---|---|
| 6,414,437 B1 | 7/2002 | Diez et al. | 315/77 |
| 7,568,815 B2 | 8/2009 | Lee et al. | 362/231 |

(Continued)

FOREIGN PATENT DOCUMENTS

| | | | | |
|---|---|---|---|---|
| DE | 4305903 A1 | 9/1994 | | B60K 20/06 |
| DE | 4419290 A1 | 12/1995 | | E05F 15/632 |

(Continued)

OTHER PUBLICATIONS

German Search Report, Application No. 102017206818.3, 10 pages, dated Dec. 12, 2017.

(Continued)

*Primary Examiner* — Adolf Dsouza
(74) *Attorney, Agent, or Firm* — Slayden Grubert Beard PLLC

(57) ABSTRACT

A gear indicator illumination unit for a vehicle, particularly for an automatic vehicle, is shown. The gear indicator illumination unit provides basic lighting and individual spot lighting from a plurality of different lighting devices, particularly in the form of LEDs. The gear indicator illumination unit has a plurality of lighting devices for indicating the gear and a memory for saving parameters and/or characteristic curves of the lighting devices.

11 Claims, 1 Drawing Sheet

(56) References Cited

U.S. PATENT DOCUMENTS

| | | | | |
|---|---|---|---|---|
| 8,708,560 B2 | 4/2014 | Kraemer | ............... | 374/162 |
| 2010/0013621 A1* | 1/2010 | Kazyaka | ............... | F16H 63/42 |
| | | | | 340/456 |
| 2015/0314725 A1* | 11/2015 | Salter | ............... | H05B 47/105 |
| | | | | 362/510 |

FOREIGN PATENT DOCUMENTS

| | | | | |
|---|---|---|---|---|
| DE | 19945546 A1 | 4/2001 | ............... | B60Q 1/14 |
| DE | 10152216 A1 | 5/2003 | ............... | G06F 11/34 |
| DE | 202004016637 U1 | 1/2005 | ............... | B60Q 3/02 |
| DE | 102007024078 A1 | 10/2008 | ............... | B60Q 3/04 |
| DE | 102008015712 A1 | 10/2008 | ............... | F21K 7/00 |
| DE | 102007044556 A1 | 3/2009 | ............... | G05D 25/02 |
| DE | 102009018233 A1 | 10/2010 | ............... | F21S 10/02 |
| DE | 102010003949 A1 | 10/2010 | ............... | G05D 25/02 |
| DE | 102010033351 A1 | 2/2012 | ............... | B60Q 1/00 |
| DE | 102013015343 A1 | 3/2015 | ............... | G05D 25/02 |
| DE | 202015105634 U1 | 1/2017 | ............... | B60Q 3/20 |
| DE | 102016203266 A1 | 8/2017 | ............... | G09G 5/12 |
| DE | 102017206818 A1 | 10/2018 | ............... | B60Q 60/00 |
| EP | 0914024 A1 | 5/1999 | ............... | H05B 33/08 |
| EP | 0952757 A2 | 10/1999 | ............... | H05B 33/08 |
| EP | 1617106 A2 | 1/2006 | ............... | F16H 59/02 |
| WO | 03/019046 A1 | 3/2006 | ............... | B60W 40/06 |
| WO | 2018/197204 A1 | 11/2018 | ............... | F16H 59/02 |

OTHER PUBLICATIONS

International Search Report and Written Opinion, Application No. PCT/EP2018/059189, 9 pages, dated Jul. 2, 2018.

* cited by examiner

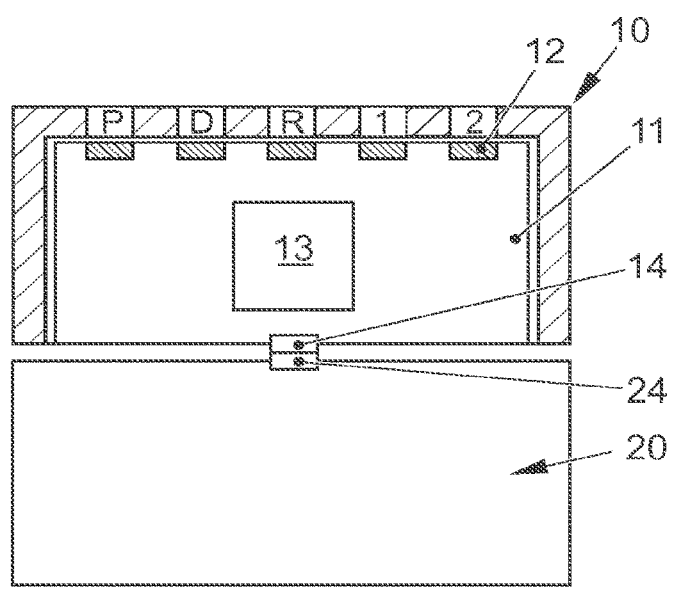

GEAR INDICATOR ILLUMINATION UNIT

CROSS-REFERENCE TO RELATED APPLICATIONS

This application claims priority to German Patent Application No. 10 2017 206 818.3, filed on Apr. 24, 2017 with the German Patent and Trademark Office. The contents of the aforesaid Patent Application are incorporated herein for all purposes.

TECHNICAL FIELD

The invention relates to a gear indicator illumination unit and a gear selector indicator system for a vehicle.

BACKGROUND

Nowadays, the gear is normally indicated in automatic vehicles by a lighting device in the form of LEDs (light-emitting device) in a gear selector cover. In this case, all of the gears of the gear selector indicator are basically lit by the LEDs as search lighting. The gear selector cover in this case is mounted on a gear selector by means of which the current gear is engaged. Corresponding to the gear currently engaged by the gear selector, an LED corresponding to the currently engaged gear is activated by the gear selector such that it is illuminated with an increased brightness, so-called spot lighting, that clearly differs from the brightness of the other LEDs of the other gears that are only basically lit. The brightness of the individual LEDs is conventionally controlled in this case by pulse width modulation (PWM).

A method and an arrangement are known from DE 10 2010 003 949 A1 for adapting parameters of lighting devices in that parameters of a first lighting device are measured before or during normal use, and parameters of a second lighting device are adapted to the measured parameters of the first lighting device also before or during normal use. In doing so, the parameters of the first lighting device may be saved.

From DE 199 45 546 A1, a method is known for activating a lighting device, in particular a taillight, of a vehicle. In this case, the lighting device, in particular in the form of LEDs, are assigned different functional ranges, and are cycled with a rated current, wherein the brightness is adjusted by a pulse width modulated signal.

A method and a device are known from the document DE 10 2007 044 556 A1 for adjusting colorimetric or photometric properties of an LED lighting apparatus with light of different colors, or respectively with LEDs emitting different wavelengths, or different LED color groups.

The gear selector indicators known in the prior art are however not optimally designed. LEDs namely have different parameters and/or characteristic curves which require a special parameter-dependent and/or characteristic-dependent selection and sorting of the LEDs and for example their resistors such as series resistors, and/or special parameter-dependent and/or characteristic-dependent activation for uniform basic lighting and respective spot lighting. Parameter-dependent and/or characteristic-dependent selection and sorting of the LEDs and for example their resistors, for example to avoid a visible color location shift, is however very time-consuming and expensive. Since the gear selector cover equipped with the LEDs and the activating gear selector are generally produced independent from each other, a special parameter-dependent and/or characteristic-dependent activation of the LEDs of the gear selector cover by the gear selector is also time-consuming and expensive.

SUMMARY

An object thus exists to design and develop the aforementioned gear indicator illumination unit to provide, in an easy and economical manner, a gear indicator illumination unit and a gear selector indicator system with uniform basic lighting and respective spot lighting from a plurality of different lighting devices, in particular in the form of LEDs.

The object is solved by a gear indicator illumination unit and a gear selector indicator system for a vehicle, in particular for an automatic vehicle, having the features of the independent claims.

Specific details, aspects, features, and advantages of the present disclosure will in the following be described using various embodiments.

BRIEF DESCRIPTION OF THE DRAWINGS

The single FIGURE shows a schematic representation of an embodiment of a gear indicator illumination unit with a plurality of lighting devices and a memory for saving one or more of parameters and characteristic curves of the lighting device, and with a bus interface using which the gear indicator illumination unit is connected to a bus interface of a gear selector and forms a gear selector indicator system.

DETAILED DESCRIPTION

In a first aspect, the gear indicator illumination unit may have a plurality of lighting devices, e.g., in the form of LEDs, to indicate the gear by means of illumination and a memory, for example a memory component such as an EEPROM, PROM, etc., for saving parameters and/or characteristic curves of the lighting devices. For example, at least one characteristic curve each for basic lighting and for spot lighting can be saved in the memory for each lighting device, e.g., each LED.

Since the gear indicator illumination unit is equipped both with the lighting devices as well as with the memory for saving parameters and/or characteristic curves of the lighting devices, the parameters and/or characteristic curves of the lighting devices can be saved directly in the memory while producing the gear indicator illumination unit, e.g., coordinated directly with the specific illumination. Accordingly, the lighting devices and the information needed for uniform basic lighting and respective spot lighting by the lighting devices can be provided in one and the same unit. On the one hand, this makes it possible to activate the lighting devices, e.g., by another component as well, such as the gear selector, in a parameter-dependent and/or a characteristic-dependent manner in order to achieve uniform basic lighting and respective spot lighting. Moreover, the gear indicator illumination unit can be individually tested as such. The other activating component such as the gear selector can be produced and tested independent of the gear indicator illumination unit and does not require any time-consuming and expensive subsequent coordination, or respectively validation with the gear indicator illumination unit during assembly. Accordingly, a variation in the gear indicator illumination unit would no longer result in a variation in the other activating component such as the gear selector. On the other hand, this also enables a color location shift, also without time-consuming and expensive parameter-dependent and/or characteristic-dependent selection and pre-sorting of the lighting devices, such as LED classes, and for example their resistors such as series resistors.

The gear indicator illumination unit may for example be designed for a motor vehicle, such as for an internal combustion engine motor vehicle, and/or a hybrid vehicle, and/or an electric vehicle.

The gear indicator illumination unit can for example be mountable or is mounted for example on a gear selector lever, and/or in the region of a gear selector lever unit.

The lighting devices, e.g., LEDs, can be activated or are activated in particular by means of pulse width modulation (PWM). In doing so, the lighting devices, e.g., the LEDs may for example be connected by a series resistor to a constant voltage source and, e.g., on their so-called low side, each individual LED can be cycled per se by a pulse width modulation. The color location of the individual lighting devices, e.g., LEDs, can be adjusted in this context for example by the series resistor, the brightness, and/or by the so-called pulse width modulation high time.

In one embodiment, the gear indicator illumination unit may be connected to a, for example, monostable or stable gear selector for detecting an engaged gear and communicating with a control unit, e.g., with a master control unit, such as with a drive control unit, for example a transmission.

In one embodiment, the gear indicator illumination unit has an interface, e.g., a BUS interface, for contacting a, or respectively the, for example, monostable or stable gear selector for detecting an engaged gear and communicating with a control unit, e.g., with a master control unit, such as with a drive control unit, for example a transmission.

In an embodiment, the interface is a specific bus interface, such as an I2C bus interface. When assembling the gear indicator illumination unit and the gear selector, the memory of the gear indicator illumination unit can be connected to the gear selector by contacting via the interface, e.g., the specified bus, such as with an interface of the gear selector. In doing so, parameters and/or characteristic curves of the lighting devices saved in the memory can be read out by the gear selector that can be contacted or is contacted by the gear indicator illumination unit via the interface, e.g., the specified bus interface, and the lighting devices can be activated taking into account the parameters and/or characteristic curves for the lighting devices saved in the memory, such as by means of pulse width modulation (PWM). Accordingly, uniform basic lighting of the lighting devices and/or lighting with increased brightness, such as so-called spot lighting, of the lighting devices corresponding to the currently engaged gear can be realized based on the parameters and/or characteristic curves saved in the memory of the illumination unit. The gear indicator illumination unit can be realized in a particularly economical manner by means of this embodiment.

In an embodiment, the interface is a serial bus interface, such as a LIN bus interface. In doing so, the gear indicator illumination unit may, e.g., have a microcontroller and/or an activation unit for activating the lighting devices. In doing so, data, e.g., on the current gear, and for example the brightness to be adjusted for it, can be transmissible by the gear selector that can be contacted or is contacted by the gear indicator illumination unit via the interface, e.g., the serial bus interface, to the microcontroller of the illumination unit. In doing so, the data, such as brightness data, from the gear selector can be evaluated by the microcontroller. The lighting devices can then be activatable by the microcontroller and/or the activation unit, e.g., by means of pulse width modulation (PMW). Accordingly, uniform basic lighting of the lighting devices and/or lighting with increased brightness, e.g., so-called spot lighting, of the lighting devices corresponding to the currently engaged gear can also be realized based on the parameters and/or characteristic curves saved in the memory of the gear indicator illumination unit. With this embodiment, the number of lines between the gear indicator illumination unit and the gear selector can be reduced.

In an embodiment, a self-diagnosis can also be carried out by the microcontroller. When an error is recognized, this can be transmitted by the microcontroller to the gear selector via the interface, such as the serial bus.

In an embodiment, the gear indicator illumination unit can be a board, for example a printed circuit board equipped with lighting devices, e.g., LEDs, and a memory, such as with a bus interface and possibly a microcontroller and/or an activation unit for activating the lighting devices, e.g., LEDs.

Moreover, the gear indicator illumination unit can, e.g., be a component of a gear selector cover.

According to another aspect, a gear selector indicator system has, e.g., an above-described gear indicator illumination unit and a gear selector for detecting an engaged gear and communicating with a control unit, for example with a master control unit, such as with a drive control unit, for example a transmission. In this context, the gear indicator illumination unit and the gear selector can be contacted for example via the interface of the gear indicator illumination unit and an interface of the gear selector.

There are many options of designing and developing the gear indicator illumination unit and/or the gear selector indicator system in a beneficial manner further. In this regard, reference is first made to the claims dependent on claim 1. In the following, another embodiment of the gear indicator illumination unit or respectively the gear selector indicator system will be explained in greater detail with reference to the drawing and the associated description.

The single FIGURE shows that the gear indicator illumination unit 11 has a plurality of lighting devices 12, in particular LEDs, for indicating the gear by illumination, and a memory 13 for saving parameters and/or characteristic curves of the lighting devices 12.

In the embodiment shown in the single FIGURE, the gear indicator illumination unit 11 moreover has an interface 14, in particular a bus interface, for contacting a, for example, monostable or stable gear selector 20 for detecting an engaged gear and communicating with a control unit, such as with a drive control unit, for example a transmission, in particular an automatic transmission or an automated transmission of a motor vehicle, therefore in particular an automatic vehicle. In doing so, the gear indicator illumination unit 11 is connected via this interface 14 to an interface 24 of the gear selector 20 and forms a gear selector display system with the gear selector 20.

The interface 14 of the gear indicator illumination unit 11 can for example be a specified bus interface, in particular an I2C bus interface, or a serial bus interface, in particular a LIN bus interface.

If the interface 14 of the gear indicator illumination unit 11 is a specified bus interface, parameters and/or characteristic curves of the lighting devices 12 saved in the memory 13 can be read out by the gear selector 20 contacted by the gear indicator illumination unit 11 via the interface 14, in particular the specified bus interface, and the lighting devices 12 can be activated taking into account the parameters and/or characteristic curves for the lighting devices 12 saved in the memory 13 by means of pulse width modulation.

If the interface 14 of the gear indicator illumination unit 11 is a serial bus interface, the illumination unit 11 can in particular also have a microcontroller and an activation unit for activating the lighting devices 12. In this case, data on the current gear can be transmitted by the gear selector 20 contacted by the gear indicator illumination unit 11 via the interface 14, in particular the serial bus interface, to the microcontroller of the gear indicator illumination unit 11, and the lighting devices 12 can be activated by the microcontroller and/or the activation unit by means of pulse width modulation. In doing so, a self-diagnosis of the illumination unit 11 can also be performed by the microcontroller. In the event of a recognized error, it can then be transmitted via the interface 14, in particular the serial bus interface, to the gear selector 20. The memory provided in the gear indicator illumination unit can then in particular be designed as a component of the microcontroller or the activation unit.

The single FIGURE illustrates that the illumination unit 11 is in particular a component of a gear selector cover 10 in this embodiment. In this case, the gear selector cover 10 serves as a user interface and, for example in a model-specific and/or brand-specific design, can be designed for example with an individual color, class, diffusion material and/or position of the lighting devices, e.g., LEDs.

REFERENCE NUMBER LIST

10 Gear selector cover
11 Gear indicator illumination unit
12 Lighting devices, in particular LEDs
13 Memory
14 Interface
20 Gear selector
24 Interface The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A gear indicator illumination unit for a vehicle, wherein the gear indicator illumination unit has a plurality of lighting devices for a gear selector indicator, a memory comprising one or more of parameters and characteristic curves of the lighting devices, and an interface for connecting with a gear selector for detecting an engaged gear; wherein
   one or more of the parameters and the characteristic curves of the lighting devices saved in the memory can be read out by the gear selector using the interface and the lighting devices can be operated taking into account one or more of the parameters and the characteristic curves that are read out.

2. The gear indicator illumination unit of claim 1, wherein the interface is one or more of a specified bus interface, an I2C bus interface, a serial bus interface, and a LIN bus interface.

3. The gear indicator illumination unit of claim 1, wherein the gear indicator illumination unit comprises one or more of a microcontroller and an activation unit for activating the lighting devices.

4. The gear indicator illumination unit of claim 3, wherein data on the current gear can be transmitted by the gear selector that can be contacted or is contacted by the gear indicator illumination unit via the interface, to the microcontroller of the illumination unit, and the lighting devices can be activated by one or more of the microcontroller and the activation unit.

5. The gear indicator illumination unit of claim 3, wherein a self-diagnosis can be performed by the microcontroller, wherein when an error is recognized, it can be transmitted to the gear selector via the interface, in particular the serial bus interface.

6. The gear indicator illumination unit of claim 1, wherein the lighting devices can be activated by means of pulse width modulation.

7. The gear indicator illumination unit of claim 1, wherein the gear indicator illumination unit is one or more of a board and a component of a gear selector cover.

8. A gear selector indicator system for a motor vehicle, wherein the gear selector indicator system has a gear indicator illumination unit according to claim 1 and the gear selector for one or more of detecting an engaged gear and communicating with a control unit.

9. The gear selector indicator system of claim 8, wherein the control unit is a drive control unit.

10. The gear indicator illumination unit of claim 1, adapted for use in an automatic vehicle.

11. The gear indicator illumination unit according to claim 1, wherein the gear indicator illumination unit has a bus interface for contacting the gear selector.

* * * * *